(12) United States Patent
Gamage et al.

(10) Patent No.: US 12,585,503 B2
(45) Date of Patent: Mar. 24, 2026

(54) UNIFIED RESOURCE MANAGEMENT ARCHITECTURE FOR WORKLOAD SCHEDULERS

(71) Applicant: VMware LLC, Palo Alto, CA (US)

(72) Inventors: Sahan Bamunavita Gamage, San Jose, CA (US); Prashanth Jonathan Victor, Sunnyvale, CA (US); Maarten Wiggers, San Francisco, CA (US)

(73) Assignee: VMware LLC, Palo Alto, CA (US)

( * ) Notice: Subject to any disclaimer, the term of this patent is extended or adjusted under 35 U.S.C. 154(b) by 523 days.

(21) Appl. No.: 18/098,164

(22) Filed: Jan. 18, 2023

(65) Prior Publication Data

US 2024/0241759 A1      Jul. 18, 2024

(51) Int. Cl.
*G06F 9/50*          (2006.01)
*G06F 9/48*          (2006.01)
(52) U.S. Cl.
CPC ............ *G06F 9/505* (2013.01); *G06F 9/4881* (2013.01)
(58) Field of Classification Search
None
See application file for complete search history.

(56) References Cited

U.S. PATENT DOCUMENTS 10,684,893 B2 *  6/2020  Siddappa ............ H04L 67/1012
2022/0035662 A1   2/2022  Wiggers et al.

OTHER PUBLICATIONS

Extended European Search Report, European Application No. 24152436.2 dated Mar. 4, 2024, 11 pages.
Hindman, Benjamin et al: "Mesos: A Platform for Fine-Grained Resource Sharing in the Data Center", Apr. 1, 2011 (Apr. 1, 2011), pp. 1-14, XP093132656, Retrieved from the Internet: www.usenix.org/legacy/events/nsdi11/tech/full_papers/Hindman.pdf.
Hindman, Benjamin et al: "Mesos, A platform for fine-grained resource sharing in the data center", Apr. 1, 2011 (Apr. 1, 2011), pp. 1-32, XP093132682, Retrieved from the Internet: www.usenix.org/legacy/events/nsdi11/tech/slides/hindman.pdf.

* cited by examiner

*Primary Examiner* — Eric C Wai
(74) *Attorney, Agent, or Firm* — King Intellectual Asset Management

(57)          ABSTRACT

Various aspects are disclosed for unified resource management for multiple workload schedulers. A resource manager receives a candidate host request from a workload scheduler. The resource manager transmits a set of candidate host snapshots for candidate hosts that match the workload resource requirements. The resource manager receives a workload allocation request for a host and reserves hardware resources on the host that match the workload resource requirements. The resource manager provides, to the workload scheduler, an indication that the hardware resources are successfully reserved for execution of the workload.

20 Claims, 5 Drawing Sheets

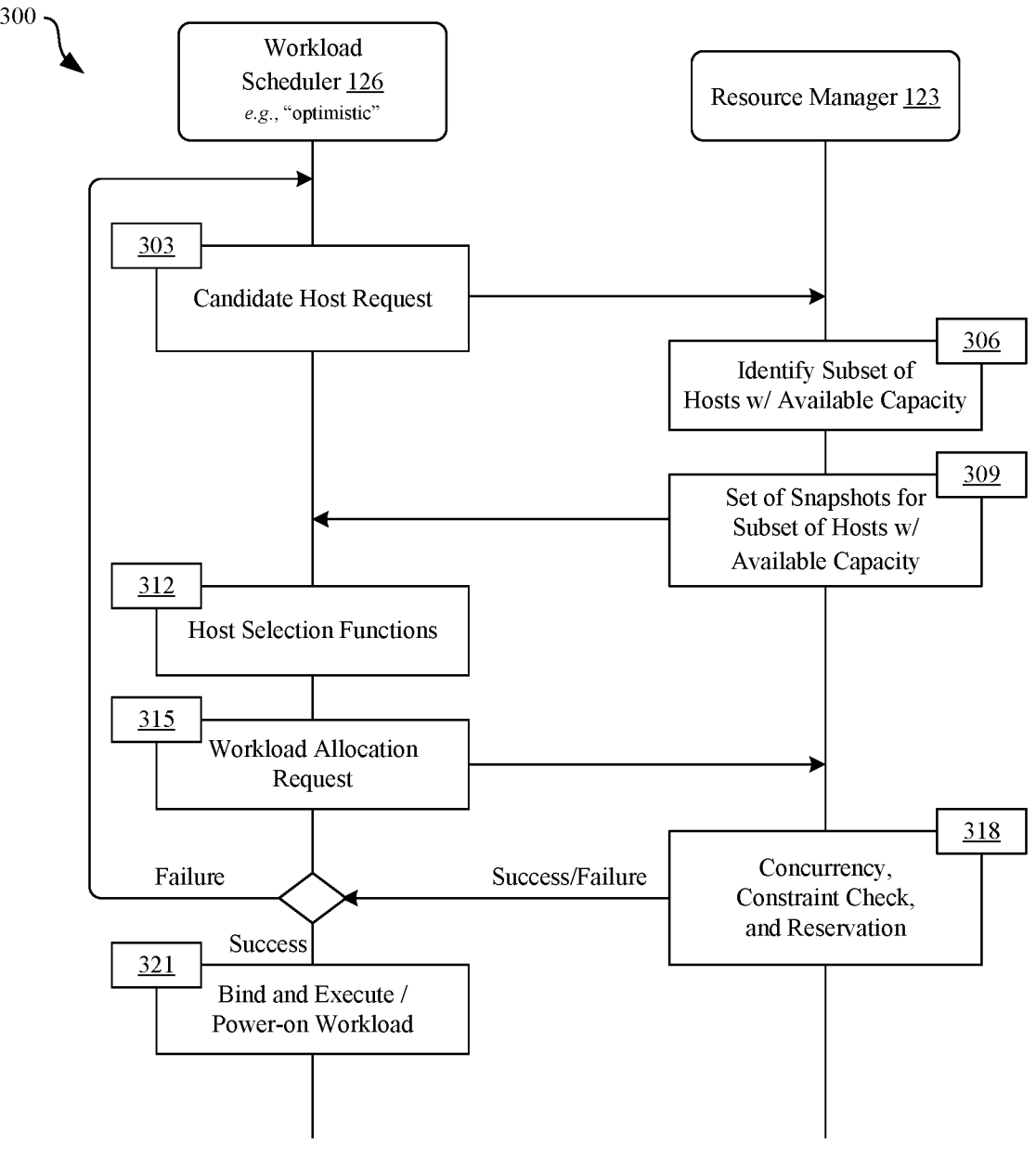

300

Workload Scheduler 126
e.g., "optimistic"

Resource Manager 123

303 Candidate Host Request

306 Identify Subset of Hosts w/ Available Capacity

309 Set of Snapshots for Subset of Hosts w/ Available Capacity

312 Host Selection Functions

315 Workload Allocation Request

318 Concurrency, Constraint Check, and Reservation

Failure    Success/Failure

Success

321 Bind and Execute / Power-on Workload

FIG. 3

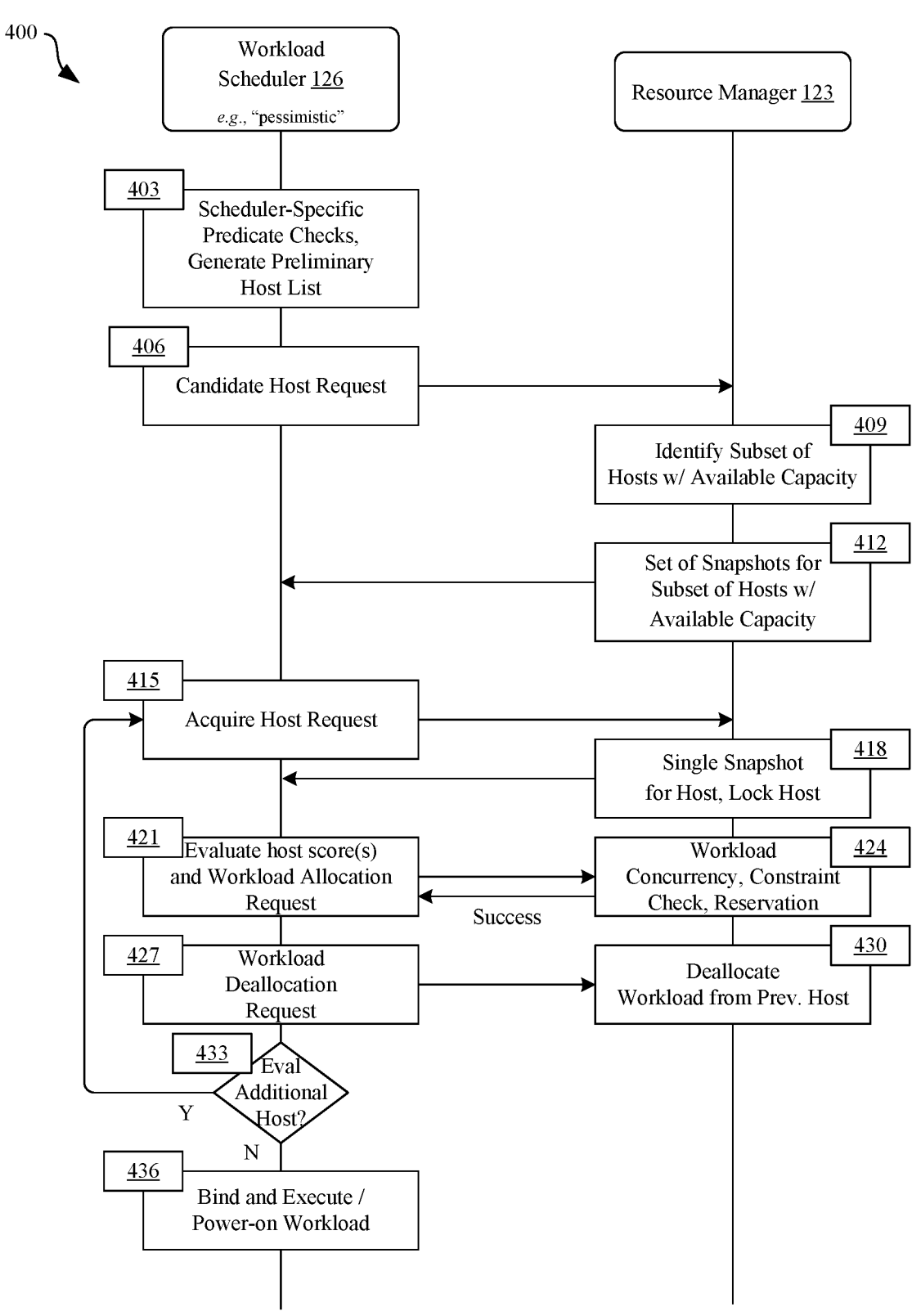

400

Workload Scheduler 126
*e.g.*, "pessimistic"

Resource Manager 123

403 — Scheduler-Specific Predicate Checks, Generate Preliminary Host List

406 — Candidate Host Request

409 — Identify Subset of Hosts w/ Available Capacity

412 — Set of Snapshots for Subset of Hosts w/ Available Capacity

415 — Acquire Host Request

418 — Single Snapshot for Host, Lock Host

421 — Evaluate host score(s) and Workload Allocation Request

424 — Workload Concurrency, Constraint Check, Reservation

Success

427 — Workload Deallocation Request

430 — Deallocate Workload from Prev. Host

433 — Eval Additional Host?

Y

N

436 — Bind and Execute / Power-on Workload

*FIG. 4*

UNIFIED RESOURCE MANAGEMENT ARCHITECTURE FOR WORKLOAD SCHEDULERS

BACKGROUND

Virtual machines have been used as the primary choice for deployment of managed enterprise software solutions. However, container-based microservices have become an increasingly popular choice for the development and deployment of large scale software products. The modular architecture can allow large software components to be deconstructed into smaller, independent, and loosely coupled modules. Because of the small footprint of these individual modules and their often stateless nature, containers are a natural fit as a deployment mechanism.

The nature of resource requirements, run time of workloads and availability requirements are widely diverse among the workloads run in managed enterprise clusters today. Allocation and distribution of resources among various workloads running in the cluster can be an arduous task for developers, which may have to perform very complex and bespoke scheduler modifications due to the addition of capabilities to support various workload types such as containers and virtual machines. The introduction of a new scheduler to the cluster that co-exists with the primary scheduler is also a very intensive process. As a result, there is a need in the art for resource management in enterprise environments.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 3 is a sequence diagram illustrating functionalities implemented by components of the unified resource management architecture.

FIG. 4 is a sequence diagram illustrating additional functionalities implemented by components of the unified resource management architecture.

DETAILED DESCRIPTION

The present disclosure relates to a unified resource management architecture for workload schedulers. The nature of resource requirements, run time of workloads and availability requirements are widely diverse among the workloads run in managed enterprise clusters today. Allocation and distribution of resources among various workloads running in the cluster can be an arduous task for developers, which may have to perform very complex and bespoke scheduler modifications due to the addition of capabilities to support various workload types such as containers and virtual machines. The introduction of a new scheduler to the cluster that co-exists with the primary scheduler is also a very intensive process. A scheduler with resource management capability can allocate and distribute resources among various workloads running in the cluster. However, this potential solution could require a very complex scheduler that requires customized updates due to the addition of capabilities to support various workload types such as containers and virtual machines. The introduction of a new scheduler to the cluster that co-exists with the primary scheduler is a very intensive process. As a result, there is a need in the art for resource management in enterprise environments.

The present disclosure describes mechanisms that provide a unified resource management architecture that can include a standardized unified resource manager that is scheduler agnostic and can perform operations for multiple different schedulers using a unified interface. This enables extensible and expandable architecture that reduces the requirement and complexity required to update a cluster. The schedulers can include multiple different types of workload schedulers such as those that deploy workloads using different virtual environments such as virtual machines, containers, and others. The schedulers can include multiple different purposes such as control plane workload schedulers for control plane or cluster management workloads, end user workload schedulers, failover capacity schedulers, graphics processing unit or accelerator schedulers, host management service schedulers, and others. In some examples, the addition of a new workload scheduler that is configured to communicate with the resource manager in this architecture does not require updates to existing schedulers.

Figure 1:
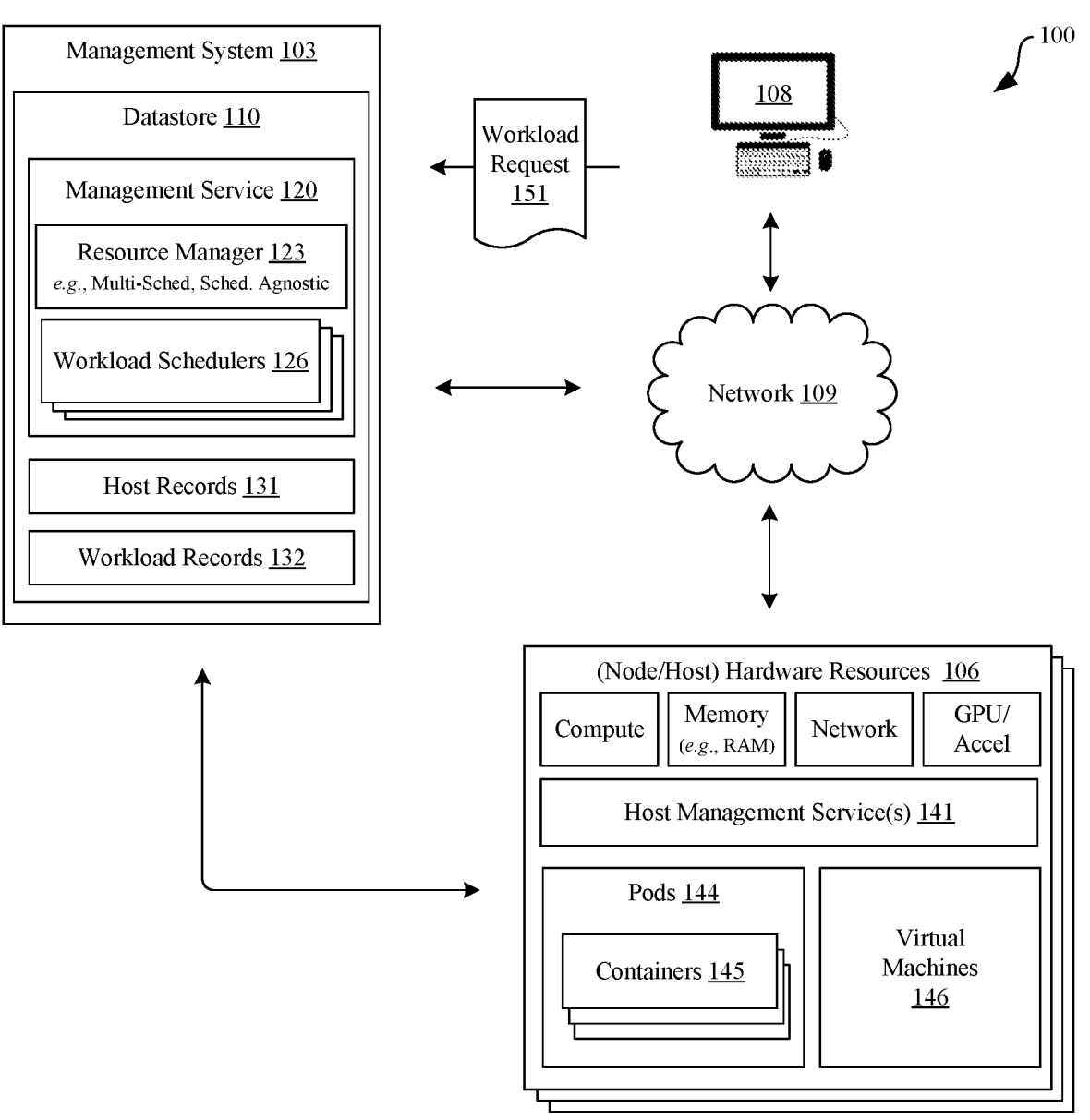
FIG. 1 is a drawing of an example of a networked computing environment that includes a unified resource management architecture for workload schedulers.

Turning to FIG. 1, an example of a networked environment 100 is shown. The networked environment 100 can include a management system 103, client device(s) 108, and hardware resources 106 in communication with one another over a network 109. The network 109 can include, for example, the Internet, intranets, extranets, wide area networks (WANs), local area networks (LANs), wired networks, wireless networks, other suitable networks, or any combination of two or more such networks.

The networks can include satellite networks, cable networks, Ethernet networks, telephony networks, and other types of networks. In some examples, the networked environment 100 can serve up virtual desktops to end users and, thus, can also be described as a virtual desktop infrastructure (VDI) environment. In other examples, the networked environment 100 can provide a public cloud computing environment, a private cloud computing environment, or a hybrid cloud computing environment. As such, the networked environment 100 can be referred to as a cloud computing environment in some examples.

The management system 103 can include a server computer or any other system providing computing capability. The management system 103 can provide access to functions for each of a number of different enterprises. While referred to in the singular, the management system 103 can include a plurality of computing devices that are arranged in one or more server banks, computer banks, or other arrangements. The management system 103 can include a grid computing resource or any other distributed computing arrangement. In some examples, the hosts that provide the hardware resources 106 can constitute the management system 103. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above. The components executed on the management system 103 can include a management service 120 as well as other applications, services, processes, systems, engines, or functionality not discussed in detail herein. The management service 120 can be stored in the datastore 110 of the management system 103.

In various embodiments, the management system 103 can include a plurality of devices installed in racks which can make up a server bank, aggregate computing system, or a computer bank in a data center or other like facility. In some examples, the management system 103 can include high-availability computing systems. A high-availability computing system is a group of computing devices that act as a single system to provide a continuous and constant uptime. The devices in the management system 103 can include any number of physical machines, virtual machines, pods, containers, virtual appliances, and software, such as operating systems, drivers, hypervisors, scripts, and applications.

In some examples, a management system 103 can include a computing environment that includes hundreds or even thousands of physical machines, as well as virtual machines 146 and other software implemented in devices stored in server racks, distributed geographically, and connected to one another through the network 109. It is understood that any virtual machine 146 or other virtual appliance can be implemented using at least one physical device, such as a server or other computing device.

The management system 103 can utilize various hardware resources 106 to enable the operation of workloads including applications, microservices, pods 144, containers 145, and virtual machines 146. The hardware resources 106 can include physical computing hardware including, servers, datastores, memories, and other storage devices, switches, routers, and other network devices, graphics cards having one or more GPUs, central processing units (CPUs), power supplies, and other devices. In various examples, the servers can include requisite physical hardware and software to create and manage virtualization infrastructure or a cloud computing environment. In some examples, the computing resources can also include virtual computing resources, such as the virtual machines 146, the containers 145, and other virtualization software components.

The management service 120 can monitor usage data for the hardware resources 106. In some cases, the hardware resources 106 can include instructions to transmit this usage data to the management service 120. The usage data can include actual usage values and metrics for compute, memory, graphics, temporary storage, persistent storage, and other resources. Errors and other metrics can also be provided in the usage data. The usage data can be included in the host records 131.

The datastore 110 can include memory of the management system 103, mass storage resources of the management system 103, or any other storage resources on which data can be stored by the management system 103. The datastore 110 can include memory and datastores for the hardware resources 106. For instance, the datastore 110 can include one or more relational databases, such as structure query language (SQL) databases, non-SQL databases, or other relational or non-relational databases. The data stored in the datastore 110, for example, can be associated with the operation of the various services or functional entities described below. The datastore 110 can include a database or other memory that includes, for example, a management service 120, a resource manager 123, a number of workload schedulers 126, host records 131, and workload records 132. Workload records 132 can include records for workloads deployed using one or more of the pods 144, containers 145, virtual machines 146, other virtual environments, and directly using various software executables.

The resource manager 123 can expose a standardized public interface such as an Application Programming Interface (API)-based interface component. The resource manager 123 can be scheduler agnostic in that it can perform operations for multiple different workload schedulers 126 using a unified and standardized public interface. The resource manager 123 can decouple the resource allocation from the scheduling components. In this architecture, the resource manager 123 can have the sole ability to perform locking and unlocking functions rather than using a workload scheduler 126 for this function. Allocation and deallocation of workloads are also performed primarily by the resource manager 123 by requests from the secondary workload schedulers 126. Scheduling or placement logic is performed by the individual workload schedulers 126.

The resource manager 123 can concurrently support multiple workload schedulers 126 that are independent from each other, in a single cluster. Each scheduler can specialize scheduling one specific type of workload. The resource manager 123 can abstract the underlying shared resources state (e.g., CPU, memory, network, GPU/accelerate) into a resource management layer which arbitrates resources among the workload specific schedulers. The resource manager 123 can abstract the underlying shared resources as units of CPU, memory, network, GPU/accelerate; as physical hosts that include certain units of CPU memory, network, GPU/accelerate; or as virtual hosts that include certain units of CPU memory, network, GPU/accelerate. Each scheduler can operate within the resource boundaries allocated by the resource manager 123 and implement the sophisticated workload-type-specific placement logic or algorithm. Various workload types can include cluster level workloads, container based workloads, virtual machine based workloads, failover capacity workloads, GPU workloads, and other types of accelerator based workloads such as AI workloads, network function workloads, and so on.

The resource manager 123 can include a filtering ability that filters hosts according to resource capacity and availability. This can include the ability to monitor resource capacity and availability for all hosts and hardware resources 106 of the cluster 200, checks real-time resource availability on hosts, and filters out infeasible hosts. The resource manager 123 can include a host snapshotting ability, which enables the resource manager 123 to capture relevant hardware resource 106 data corresponding to a host machine. This snapshot can capture the real-time host resource utilization and form a data structure for analysis by the workload schedulers 126 for workload placement. The snapshot can include a view of host total capacity as well as utilization of all workloads from all workload schedulers 126. Without this universal snapshot, an individual workload scheduler 126 can be limited to awareness of its own scheduled workloads as the demand side, and the total capacity. As a result, the workload schedulers can overestimate free or available resources unless the universal snapshot is obtained from the resource manager 123.

The resource manager 123 can include a concurrency control ability, and a workload and resource allocation. Concurrency control manages per-host locking when a scheduler requires exclusive access to a host's resource state. Resource allocation consumes resources on a host. The resource manager 123 may reject an allocation request if the host is no longer feasible for the task's demand.

Each workload scheduler 126 interacts with the resource manager 123 to allocate and deallocate workloads to hardware resources 106 and to query the available capacity of hardware resources 106 provided by hosts. In other words, even if the respective workload schedulers 126 have knowledge of the hosts in a cluster, none of the workload schedulers 126 are enabled to have unconstrained, top level, or parent control of a host or set of hardware resources 206. Rather, each workload scheduler 126 can merely request temporary and subsidiary access to the host or set of hardware resources 206, while top level control remains with the resource manager 123.

The workload schedulers 126 can oversee the deployment of workloads that utilize hardware resources 106. For example, the various different workload schedulers 126 can create, organize, prioritize, distribute, balance, and destroy virtual machines 146, pods 144, containers 145, and other software components that include workloads that are assigned to utilize the hardware resources 106.

The workload scheduler 126 can utilize hardware resource providers that can be referred to as hosts or nodes. Each host or node can provide a particular subset of hardware resources 106. In some cases, each host can execute host management services 141 or virtual machine deployment platform instructions associated with a virtual machine deployment platform. The host management services 141 can include one or more software components that work in concert with the various workload schedulers 126 to deploy workloads.

Resource isolation or tenancy between enterprises, user groups, and users can be provided using resource pools. For example, each hardware resource 106 can be exclusively assigned to a single resource pool at a time. Affinity rules such as affinities and anti-affinities can be provided using virtual machine groups and host groups. For example, a virtual machine 146, pod 144, or container 145 can be logically associated with an affinity or anti-affinity with a host or another virtual machine 146, pod 144, or container 145. Resource requirements can be defined using a number of logical constructs such as compute, memory, network, GPU, accelerate (e.g., artificial intelligence or other specialized function processing), and other types of resources, as well as reservations, limits, and shares for allocation.

A host record 131 can represent information related to hardware resources 106 used to execute a workload such as an application, microservice, pod 144, container 145, or virtual machine 146. The host record 131 can include information such as the amount of memory installed on a host providing a subset of the hardware resources 106, the number and type of processors installed on the host, the number and type of GPUs installed on the host, the number and type of network connections installed on the host, and various other data. The host record 131 can also include information related to the workloads currently deployed on a host. This can include a record of specific applications, microservices, pods 144, containers 145, or virtual machines 146 that are identified using respective identifiers. The identifiers can include a common name associated with a particular application (or microservice, pod 144, container 145, or virtual machine 146), as well as universally unique identifiers that can identify a particular instance of the application or another component.

The host record 131 can include a record of the number of virtual machines 146, pods 144, and containers 145, as well as other workloads that are hosted using the hardware resources 106. As another example, the host record 131 can include a record of the amount and type of computer resources currently allocated to each of the virtual machines 146 deployed to the host. These records can include the number of processor cores, amount of memory, amount of storage, number of GPUs, and the number of network connections. Likewise, the host record 131 can include the amount of allocated computer resources consumed by each of the virtual machines 146. For example, the host record 131 can include an indication that one virtual machine 146 is consuming 75% of the memory allocated to it and is using 47% of the processor resources allocated to it, while another virtual machine 146 is consuming 15% of the memory allocated to it and is using 97% of the processor resources allocated to it.

A workload record 132 can represent information related to a workload, which can be embodied by one or more virtual machine 146, pod 144, container 145, or other virtual environment. For example, the information can include an identifier such as a universally unique identifier (UUID) or name for the virtual machine 146, pod 144, container 145, a version and type of operating system installed in the environment. A workload record 132 can also include the number and type of applications installed. In some implementations, the workload record 132 can also include a record of the amount and type of computer resources currently allocated to the virtual machine 146, pod 144, container 145, or other virtual environment associated with the workload. For example, the workload record 132 can include the number of processor cores, amount of memory, amount of storage, number of GPUs, and the number of network connections, GPUs, and accelerators. Likewise, the workload record 132 can include the amount of allocated computer resources currently consumed by the workload. For example, the workload record 132 can include an indication that a virtual machine 146, pod 144, container 145, or other virtual environment is consuming 75% of the memory allocated to it and is using 47% of the processor resources allocated to it. In some implementations, this information may be recorded in the workload record 132 on a historical basis, for example hourly, daily, monthly, and so on.

The components executed on the management system 103 can include, for example, a management service 120 as well as other applications, services, processes, systems, engines, or functionality not discussed in detail herein. The management service 120 can be executed to oversee the operation of the networked environment 100 through management of the hardware resources 106 as well as the physical and virtual computing resources that make up the hardware resources 106. In some examples, an enterprise, organization, or other entity can operate the management service 120 to oversee or manage the operation of devices in racks, such as servers, switches, datastores, CPUs, GPUs, power supplies, cooling systems, and other components.

A workload request 151 for a workload such as a pod 144 can be processed to provide function-as-a-service (FaaS) on behalf of an enterprise through public cloud services, private cloud services, hybrid cloud services, or a combination thereof. In another example, the workload request 151 can include requests initiated by employees of an enterprise for remote desktop sessions or other virtualized computing sessions. The workload request 151 can include pods 144 that are processed to provide serverless architecture. Serverless architecture can refer to the management system 103 providing FaaS for a workload request 151. In some cases, the serverless architecture can manage multiple workloads from multiple workload requests 151, which collectively provide a larger service for the enterprise.

The management service 120 can organize and execute the workloads using virtual machines 146, pods 144, and containers 145, and other virtual environments. The management service 120 can also provide persistent data for the workloads using hardware resources 106 without requiring an enterprise, developer, or administrator to configure and maintain a specific proprietary server.

Figure 2:
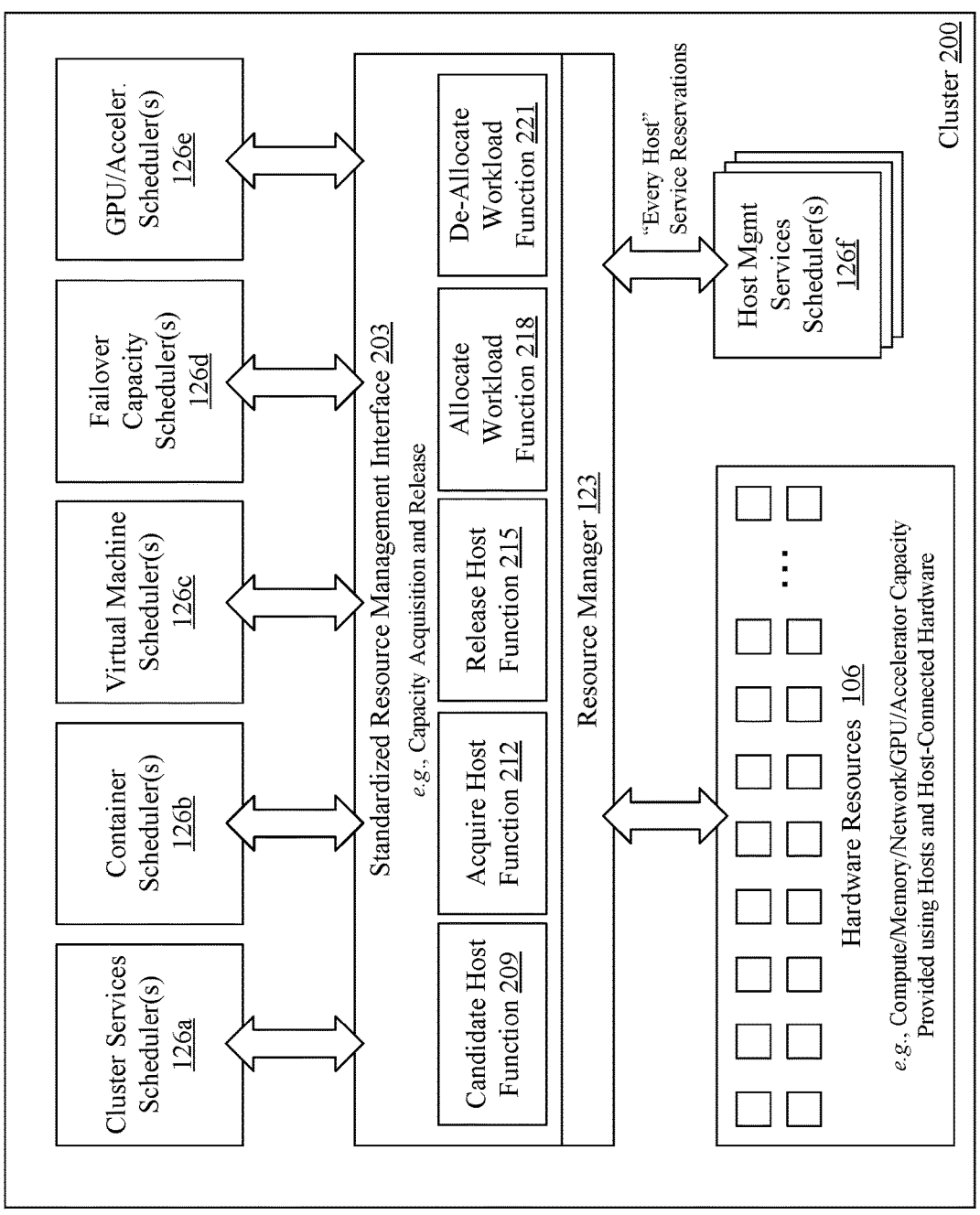
FIG. 2 is a drawing that illustrates a cluster that provides an example of multiple workload schedulers in a unified resource management architecture.

FIG. 2 shows an example of a cluster 200 of hosts in the networked environment 100. The cluster 200 can include a set of hosts corresponding to hardware resources 106 that are assigned to a particular enterprise using the management service 120 and the resource manager 123. The cluster 200 can also include the hardware resources 106.

The cluster 200 can include the resource manager 123 as well as a number of workload schedulers 126. The workload schedulers 126 can include a cluster services scheduler 126a, container scheduler 126b, virtual machine scheduler 126c, failover capacity scheduler 126d, and GPU or accelerator scheduler 126e. The workload schedulers 126 can also include host management services scheduler 126f. The resource manager 123 can include a standardized resource management interface 203.

In this multi-scheduler resource management architecture the resource manager 123 can arbitrate the resources among the workload schedulers 126a-126f. Each workload scheduler 126 only focuses on finding its preferred host for the given workload, and relies on the resource manager 123 to perform resource allocation and admission control such as acquiring and releasing locks and allocating and deallocating workloads. Each workload scheduler 126 can assume there are other scheduler threads concurrently placing workloads in the cluster 200. The resource manager 123 provides the standardized resource management interface 203, which enables workload schedulers 126 to allocate and deallocate resources and query the resource states of hosts representing hardware resources 106 in the cluster 200. The resource manager 123 has interfaces with the hardware resources 106 as well, and can monitor the host hardware resource 106 states such as total capacity and available capacity based on information exposed from hosts.

The resource manager 123 performs the internal bookkeeping of in-memory resource state of the cluster 200. For a multi-scheduler environment, in addition to simple bookkeeping of hardware resource 106 states, the resource manager 123 can allocate and deallocate resources on certain hosts as well as to query resources on hosts based on the concurrency control mechanism used in the different workload schedulers 126.

The standardized resource management interface 203 can be a standardized public interface such as an Application Programming Interface (API)-based interface component exposed by the resource manager 123. The standardized resource management interface 203 can be scheduler agnostic in that it can provide a way for multiple different workload schedulers 126 to perform a number of different resource management actions of the resource manager 123, using a unified and standardized public interface.

The standardized resource management interface 203 can provide multiple different APIs or other types of interface functions that can be invoked corresponding the various resource management actions or functions of the resource manager 123. For example, the standardized resource management interface 203 can provide a candidate host function 209. The candidate host function 209 can be an API or other interface component that takes the resource requirements of a task or workload, and optionally an initial vector or set of host identifiers, and returns a set of candidate hosts with free or available resources matching (i.e., greater than or equal to) the resource requirements. By default, unless an initial set of host identifiers are provided when invoking the host request interface function, all hosts or hardware resources 106 in the cluster are considered. When the candidate host function 209 is called, a resource manager 123 returns a vector or set of candidate host snapshots and corresponding host identifiers. If an initial vector or set of host identifiers is specified in the request, the resource manager 123 returns a vector or set of candidate host snapshots and identifiers that is a subset of the initial set of host identifiers.

The standardized resource management interface 203 can provide an acquire host function 212. The acquire host function 212 can be an API or other interface component that requests a lock on one or more specified hosts. The acquire host function 212 can take one or more host identifier and return one or more snapshot corresponding to the one or more host identifier. The acquire host function 212 can cause the resource manager 123 to lock or guarantee that the host's resource state or set of workloads executing on that host is unmodified until it is released. For example, locking the host can cause the resource manager 123 to prevent allocation of additional workloads to the specified host until the release host function 215 is invoked for the host. The resource manager 123 can also implement a time-out to this function so the host is automatically released after a certain period of time of no response from the requesting workload scheduler 126. A lock can prevent usage of the allocate workload function 218 if it specifies the locked host. The lock can in some examples prevent usage of the deallocate workload function 212 that specifies the host. The lock can also prevent the candidate host function 209 from returning the host's identifier and snapshot.

The standardized resource management interface 203 can provide a release host function 215. The release host function 215 can be an API or other interface component that requests to release a lock on one or more specified hosts. The acquire host function 212 can take a host identifier as input and cancel or release a lock for that host.

The standardized resource management interface 203 can provide an allocate workload function 218. The allocate workload function 218 attempts to allocate a task on a particular host. This can include an implicit lock acquired during the update to include a specified workload on a specified host. The workload can be specified by workload or task identifier and specified resource requirements. Based on the specified workload, resource requirements, and host, the allocate workload function 218 can perform an initial constraint check based on the resource requirements. If this initial constraint check passes, indicating sufficient available resources are still available, the allocate workload function 218 can enable the related workload scheduler 126 to add the workload to the host. If the constraint check fails or the required resources are no longer available when adding the workload, the overall call to this function can fail and the workload scheduler 126 is prevented from adding the workload. Generally, the allocate workload function 218 can usually succeed in the example of pessimistic type schedulers that use the acquire host function 212 prior to allocation. Optimistic schedulers that do not use the allocate workload function 218 can fail more often.

The standardized resource management interface 203 can provide a deallocate workload function 221. The allocate workload function 218 removes a specified task from a specified host. In other words, the allocate workload function 218 takes inputs of a task or workload identifier and a resource or host identifier, and in response can deallocate the workload by halting and deleting the workload.

The cluster services schedulers 126*a* can refer to a scheduler that launches workloads that include cluster level management services for the cluster 200. This type of scheduler can schedule services that can add a new host to the cluster 200, remove a host from the cluster 200, monitor and provide operational statistics to be viewed using a user interface of the management service 120.

The container scheduler 126*b* can refer to a scheduler that launches workloads in containers 145 and pods 144 of multiple containers 145. This type of scheduler can schedule enterprise workloads of any kind, which can ultimately be launched within a container 145 or a pod 144. The enterprise workloads can include applications in the enterprise line of business, such as business applications, enterprise content applications, user collaboration applications, enterprise analytics applications, artificial intelligence applications, application development and testing tools, public facing web servers, and others.

The virtual machine scheduler 126*c* can refer to a scheduler that launches workloads in virtual machines 146. This type of scheduler can schedule enterprise workloads discussed above, using virtual machine 146 environments.

The failover capacity scheduler 126*d* can refer to a scheduler that launches workloads that reserves failover capacity for high availability or other types of failover. In the case of high availability failover, the failover capacity scheduler 126*d* can launch a workload that matches a workload already executing in another host. The workload can be copied and ready for launch or can be executing but relatively idle, ready for immediate switchover in response to a failure of the active workload in use in the other host. This can provide a seamless transition or minimal loss of time between failure on one host and switching to the failover host.

The GPU scheduler 126*e* can refer to a type of scheduler that launches GPU intensive applications or GPU-specific instructions that are executed by a GPU. The GPU scheduler 126*e* can be a type of accelerator workload scheduler that uses a GPU accelerator. An accelerator workload scheduler launches other types of accelerator intensive applications or accelerator-specific instructions that are executed by an accelerator such as a network function accelerator, a graphics processing accelerator, or an artificial intelligence accelerator.

The host management services scheduler 126*f* can refer to a type of scheduler that launches host level management services. This type of scheduler can provision certain management software on all or most of the hosts that are added to the cluster 200, and can in some examples communicate with the resource manager 123 through a separate communications channel than the standardized resource management interface 203. However, the host management services scheduler 126*f* can also use the standardized resource management interface 203.

Rather than directly owning or directly performing workload allocation and deallocation, and acquiring and releasing host locks directly, each workload scheduler 126 can instruct the resource manager 123 to perform these workload actions. Each workload scheduler 126 can be modified with a software module of executable code that translates its typical commands into standardized API or interface calls that invoke the various functions of the resource manager 123. The modifications can be performed within the scheduler or externally by proxy. In either case the command modification module can intercept traditional resource management commands and translate them into a standardized form for the standardized resource management interface 203. In other examples, each workload scheduler 126 can be a version of the workload scheduler 126 that directly generates standardized resource management interface 203 requests rather than generating traditional resource management commands.

Candidate host snapshot or host probing commands can be translated into a standardized candidate host function or acquire the host function interface call that invokes the associated function through the standardized resource management interface 203. Acquire host or host locking commands can be translated into a standardized acquire host or host locking API or interface call that invokes the acquire host function 212. Release host or host unlocking commands can be translated into a standardized release host or host unlocking API or interface call that invokes the release host function 215. Workload allocation commands can be translated into a standardized workload allocation API or interface call that invokes the allocate workload function 218. Workload deallocation commands can be translated into a standardized workload deallocation API or interface call that invokes the allocate workload function 218.

The resource manager 123 can define parameters and formatting that is to be used by the workload schedulers 126 to use the standardized resource management interface 203. One nonlimiting example is provided in Table I.

TABLE I

```
class ClusterRM {
    /* Interface for schedulers */
    vector<HostSnapshot> GetAllHostsWithFreeRes(TaskSpec
        task, vector<MoNum> candidates = allHosts);
    vector<HostSnapshot> AcquireHost (vector<MoNum>
        hostIds);
    void ReleaseHost (vector<MoNum> hostIds);
    bool AllocOnHost (MoNum hostId, taskSpec task);
    void DeallocOnHost (MoNum hostId, TaskSpec task);
    /* Interface for host events */
    void onHostAdd (MoNum hostId);
    void onHostRemove (MoNum hostId);
};
class HostSnapshot {
    int cpuCapacityMHz;
    int memCapacityMB;
    int cpuDemandMHz;
    int memDemandMB;
};
    class TaskSpec {
    int cpuDemandMHz;
    int memDemandMB;
};
```

In this nonlimiting example, the class "TaskSpec" indicates that a workload requirement should include predicted CPU demand of the workload in units of MHz and memory demand in units of MB. However, in other examples, network demand, GPU demand, and other accelerator demand can also be specified using respective units and using an integer type of parameter specified according to the class. Likewise, the host snapshot indicates host CPU capacity in units of MHz and host memory capacity in units of MB, as well as current actual CPU demand in units of MHz and current actual memory demand of the host in units of MB.

Resource manager 123 maintains internal data structures that track the resource metrics of all the workloads and hosts in the cluster, including the host records 131 and workload records 132. The resource utilization of a given host can be the sum of resources consumed by the tasks currently running on the host as well as those tentatively scheduled to run on the host by an external workload scheduler 126. The resource metrics tracked include the demand and reservation of each physical resource (CPU, memory, networking, etc.). When the acquire host function 212 is called by a workload scheduler 126, the resource manager 123 locks the specified host(s) and blocks incoming scheduling requests from other workload schedulers 126 for the locked hosts. Subsequently, when the allocate workload function 218 is called by a workload scheduler 126, the resource manager 123 adds the resource consumption specified in the task spec to the specified host. If adding the reservation of the incoming task would exceed the capacity of the host, the resource manager 123 will throw an Insufficient Resources exception and fail the allocate workload function 218 operation. If the reservation fits within the host capacity, the resource manager 123 can indicate that the allocate workload function 218 succeeded, and at that point, the workload scheduler 126 that owns the task can start it on the host.

If allocate workload function 218 is called by a workload scheduler 126 that has not requested and has not been assigned a lock on a host then the resource manager 123 internally invokes and performs its acquire host function 212 to get the lock. Once allocation succeeds, the resource manager 123 automatically calls the release host function 215 so that the host is unlocked for subsequent scheduling requests.

A workload scheduler 126 can choose to acquire a host, evaluate it, and release it immediately without allocating on the host if it determines that the host is not the best choice for a particular task. Workload schedulers 126 can allocate on multiple hosts before deciding which host to finally choose to run the task. The resource manager 123 keeps track of all hosts that have been allocated for a given task. When the task starts to run on one of the acquired hosts, the resource consumption of the task is realized on that host, and resource manager 123 deallocates the other allocated hosts for the task.

While the resource manager 123 can expose a standardized set of interface functions through the standardized resource management interface 203, the various workload schedulers 126 can each have their own preferred process for host selection. Generally, regardless of the type of workload that they schedule, the workload schedulers 126 can operate under one of two implementation categories that can be described as optimistic and pessimistic concurrency control styles.

Workload schedulers 126 using optimistic concurrency can evaluate all candidate hosts purely based on cached snapshots of the hosts' available resources, without having acquired a lock on any of the hosts. Optimistic concurrency assumes that the initial snapshot will be representative of the host state, and is subject to failure at the point of allocation, since another workload scheduler 126 may have taken the resources between the initial snapshot and workload allocation. Kubernetes™ scheduler and Omega™ are two examples that use optimistic concurrency. If allocation fails, optimistic schedulers can automatically requeue a pod 144 or container 145 to the scheduling queue, and make another attempt to place the workload.

Workload schedulers 126 using pessimistic concurrency can acquire a lock on a candidate host, evaluate that candidate host with its lock acquired so that resources on the host won't be consumed by other schedulers. As a result, the eventual allocation request for the ultimately selected host will always succeed for workload schedulers 126 using pessimistic concurrency. This is a more intrusive style of evaluation, but each of optimistic and pessimistic concurrency control has its benefits and drawbacks.

In FIG. 3, shown is a sequence diagram 300 that provides one example of the operation of components of the networked environment 100. The sequence diagram 300 outlines how the components of the networked environment 100 work in concert to provide a unified resource management architecture. Generally, the sequence diagram 300 outlines how an "optimistic" workload scheduler 126 can interact with the resource manager 123 to schedule and execute a workload. While a particular step or action can be referred to as performed by a particular component, other components of the architecture can perform certain aspects of the step or action, as can be understood.

In step 303, the workload scheduler 126 can transmit a candidate host request to the resource manager 123. The candidate host request can invoke the candidate host function 209 of the standardized resource management interface 203. The candidate host function 209 can be an API or other interface component that takes the resource requirements of a task or workload, and optionally an initial vector or set of host identifiers, and returns a set of candidate hosts with free or available resources matching (i.e., greater than or equal to) the resource requirements.

In step 306, the resource manager 123 can identify a subset of hosts that have available resources that match the workload resource requirements specified in the candidate host request. The subset of hosts can be a subset of all hosts in a cluster 200, or a subset of hosts specified in the candidate host request. The subset of hosts can be considered a subset of initial hosts, and can also be considered a set of candidate hosts that are a capable of executing the specified workload according to the workload's resource requirements.

In step 309, the resource manager 123 can make snapshots of the subset of hosts identified in step 306. The resource manager 123 can then return the snapshots to the workload scheduler 126 for evaluation and host selection.

In step 312, the workload scheduler 126 can execute its host selection function or functions to identify which host to select from the set of candidate hosts (the subset of initial hosts with available capacity). The workload scheduler 126 can analyze the snapshots to select a host for the workload. This can include calculating a goodness score for each host, and selecting the host with the score corresponding to the best or optimal placement among the hosts considered using the workload-type-specific host selection function of the workload scheduler 126.

In step 315, the workload scheduler 126 can transmit a workload allocation request to the resource manager 123. The workload allocation request can invoke the allocate workload function 218. The workload allocation request can specify the host identifier and resource requirements of the workload.

In step 318, the resource manager 123 can perform concurrency, a constraint check, and reservation of the resource requirements of the workload. The concurrency action can include locking the host, which occurs since the optimistic workload scheduler 126 does not explicitly request a lock. The constraint check can include checking whether the host still has available resources that matches the resource requirements of the workload. This is performed since optimistic concurrency style schedulers do not acquire a lock during the evaluation and host selection phase, so another workload scheduler 126 may have added workloads in the interim period between the initial "candidate" host snapshot and allocation time. If the constraint check is successful, then the resource manager 123 can reserve the resources corresponding to the workload requirements and return an indication of success, and the process moves to step 321. Otherwise, if the constraint check, reservation, or other aspects of the allocation fails, then the optimistic workload scheduler 126 can place the workload back in the queue or immediately restart the process at step 303.

In step 321, the workload scheduler 126 can bind power on the workload to the selected and allocated host. This causes the workload scheduler 126 to copy or provide the host access to the data and executables of the workload and initiate execution of the workload using the host.

In FIG. 4, shown is a sequence diagram 400 that provides one example of the operation of components of the networked environment 100. The sequence diagram 400 outlines how the components of the networked environment 100 work in concert to provide a unified resource management architecture. Generally, the sequence diagram 400 outlines how a "pessimistic" workload scheduler 126 can interact with the resource manager 123 to schedule and execute a workload. While a particular step or action can be referred to as performed by a particular component, other components of the architecture can perform certain aspects of the step or action, as can be understood.

In step 403, the workload scheduler 126 can perform scheduler-specific and workload-type-specific predicate checks to generate a preliminary host list. The resource manager 123 can identify host reevaluation events or host data events such as the addition or removal of a host from the hardware resources 106. In response to these events, the resource manager 123 can provide each workload scheduler 126 with host data for each host in a cluster 200. The host data can include the CPU capacity, memory capacity, network capacity, GPU capacity, accelerate capacity, and other hardware resources 106 capacities provided by that particular host. As a result, the workload scheduler 126 can have a record that indicates total capacity for all hosts in the cluster 200. However, the workload scheduler 126 does not have up to date information about the workloads and resource usage or demand on each host.

The workload scheduler 126 can perform scheduler-specific and workload-type-specific predicate checks to identify a set of initial hosts that have sufficient capacity to execute the workload at issue based on its resource requirements. However, in order for the workload scheduler 126 to identify if the free or available capacity for the host is sufficient to match the workload, the workload scheduler 126 can use the candidate host function 209. While the pessimistic type scheduler is described as performing this function, it can also be incorporated into the optimistic scheduler flow of FIG. 3.

In step 406, the workload scheduler 126 can transmit a candidate host request to the resource manager 123. The candidate host request can invoke the candidate host function 209 of the standardized resource management interface 203. The candidate host function 209 can be an API or other interface component that takes the resource requirements of a task or workload, and optionally a vector or set of initial host identifiers, and returns a set of candidate hosts with free or available resources matching (i.e., greater than or equal to) the resource requirements. In this example, it includes a vector or set of initial host identifiers that limits the resource manager 123 to these hosts rather than all hosts of the cluster 200.

In step 409, the resource manager 123 can identify a subset of hosts that have available resources that match the workload resource requirements specified in the candidate host request. The subset of hosts in this example can be a subset of initial hosts specified in the candidate host request. The subset of initial hosts can be referred to as a set of candidate hosts that have sufficient free or available resources that match the resource requirements specified for the workload according to the workload's resource requirements.

In step 412, the resource manager 123 can make snapshots of the subset of hosts identified in step 409. The resource manager 123 can then return the snapshots to the workload scheduler 126 for evaluation and host selection.

In step 415, the workload scheduler 126 can transmit an acquire host request to the resource manager 123. The acquire host request can specify one or more of the hosts provided along with their snapshots in the response to the candidate host request. In other words, the workload scheduler 126 can in some examples place a lock on a single host at a time, and in other examples can lock multiple hosts at a time.

In step 418, the workload scheduler 126 can evaluate the host score or scores of one or more of the locked hosts. In some examples, the workload scheduler 126 can evaluate scores for all locked hosts at once, or can evaluate scores for a single locked host at a time. This can include executing a host selection function. In situations where one locked host is considered at a time, if the host under consideration is a second, third, or other subsequent host, the workload scheduler 126 can compare it to a previous host's score. The workload scheduler 126 can analyze the snapshots to select a host for the workload. This can include calculating a goodness score for the host or hosts under consideration, and selecting the host with the score corresponding to the best or optimal placement between or among the hosts considered using the workload-type-specific host selection function of the workload scheduler 126.

The workload scheduler 126 can transmit a workload allocation request that specifies the selected host. In some examples, a first host considered in a one-host-at-a-time approach can result in a workload allocation request, while subsequent hosts under consideration result in a workload allocation request only if the more recent host scores better than the previous host.

In step 421, the workload scheduler 126 can transmit a workload allocation request to the resource manager 123. The workload allocation request can invoke the allocate workload function 218. The workload allocation request can specify the host identifier and resource requirements of the workload.

In step 424, the resource manager 123 can perform concurrency, a constraint check, and reservation of the resource requirements of the workload. The constraint check can include checking whether the host still has available resources that matches the resource requirements of the workload. However, for pessimistic schedulers that acquire locks, this check is highly likely to succeed, since another workload scheduler 126 cannot add workloads in the interim period between the "candidate" host snapshot and allocation time. The resource manager 123 can reserve the resources corresponding to the workload requirements and return an indication of success, and the process moves to step 427 (or 433).

In step 427, the workload scheduler 126 can transmit a deallocation request for a previous workload allocation request. However, if the successful allocation was a first allocation request in a one-by-one (or two by two, etc.) host consideration scenario, or if the workload scheduler 126 considers all locked workloads at once, then this can be omitted and the process can proceed to step 433.

In step 430, the resource manager 123 can deallocate workload from the previous host. The resource manager 123 can receive the deallocation request and deallocate the workload in response to the request.

In step 433, the workload scheduler 126 can determine if there are additional hosts to consider. This can occur in sequential one-by-one (or two by two, etc.) host consideration scenario. However, if the workload scheduler 126 considers all locked workloads at once, then this can be omitted and the process can proceed to step 436.

In step 436, the workload scheduler 126 can bind power on the workload to the selected and allocated host. This causes the workload scheduler 126 to copy or provide the host access to the data and executables of the workload and initiate execution of the workload using the host.

Figure 5:
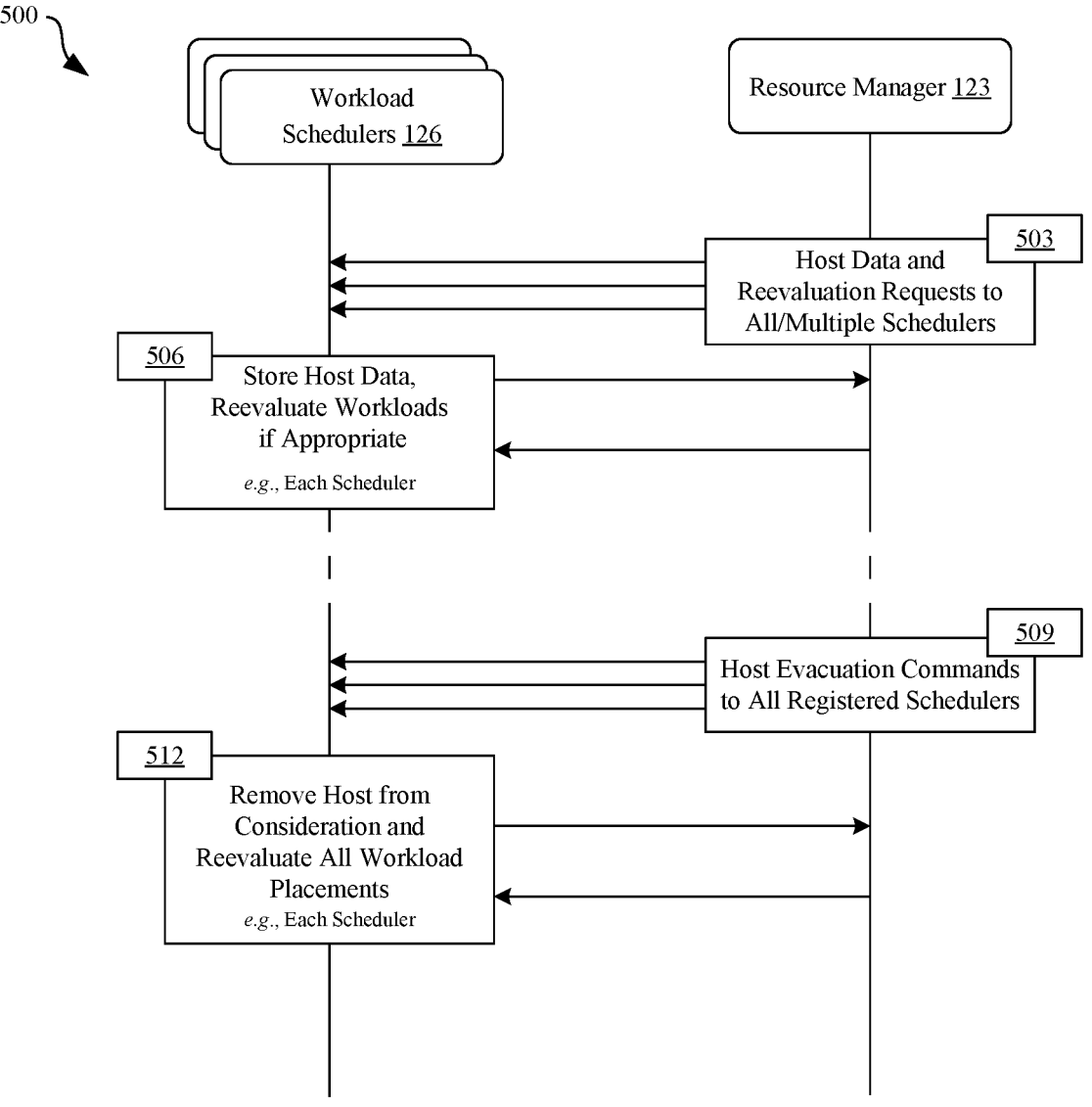
FIG. 5 is a sequence diagram illustrating additional functionalities implemented by components of the unified resource management architecture.

In FIG. 5, shown is a sequence diagram 500 that provides one example of the operation of components of the networked environment 100. The sequence diagram 500 outlines how the components of the networked environment 100 work in concert to provide a unified resource management architecture. Generally, the sequence diagram 500 outlines how the resource manager 123 can provide host data and instructions related to events that involve or are applicable to all or multiple different workload schedulers 126. While a particular step or action can be referred to as performed by a particular component, other components of the architecture can perform certain aspects of the step or action, as can be understood.

In step 503, the resource manager 123 can transmit host data and reevaluation requests to multiple workload schedulers 126. The resource manager 123 can identify host reevaluation events and other host data events such as the addition of a host from the hardware resources 106, consistent overloading of a particular host, and so on. The resource manager 123 can detect the addition of a new host in the cluster 200 based on a message from the host itself or from a cluster management workload of the management service 120. The addition of a new host can cause the resource manager 123 to transmit and report its total capacity to all workload schedulers 126 in the cluster. The resource manager 123 can provide each workload scheduler 126 with host data for each host in a cluster 200. The host data can include the CPU capacity, memory capacity, network capacity, GPU capacity, accelerate capacity, and other hardware resources 106 capacities provided by that particular host.

The resource manager 123 can also monitor resource usage of each host periodically. If the resource demand or use is consistently or instantaneously identified to operate over a predetermined threshold such as a percentage of total capacity for a particular hardware resource 106 (e.g., where consistency is based on identifying a threshold percentage of monitoring events triggered by respective thresholds, or triggering a threshold number of monitoring events in a row), then the resource manager 123 can identify all workload schedulers 126 that have workloads on the overloaded host, and request that they reevaluate workload placement.

In step 506, the workload schedulers 126 can store the host data and reevaluate workload placements if appropriate. Reevaluation of workloads can occur in response to receiving host data and in response to a request to reevaluate workloads. Reevaluation of workloads can proceed using a process as shown in FIG. 3 or 4, which can apply to initial placements as well as workload migrations.

In step 509, the resource manager 123 can transmit evacuation commands to multiple workload schedulers 126. The resource manager 123 can monitor the hosts and evaluate a health or reliability score. If the health or reliability score of the host passes a threshold score, then the resource manager 123 can determine that the host must be taken offline. Health or reliability scores can be determined using resource utilization information, software or operating system error logs and crash reports, hardware error reports, temperature parameters, and other parameters of the host. Additionally or alternatively, the resource manager 123 can receive a message from a host management service scheduler 126*f* (FIG. 2), that a cluster management service scheduler 126*a* (FIG. 2), or another component of the management service 120 indicating that the host is to be taken offline. This can be for reliability issues, host management service upgrades, cluster management service upgrades, and any upgrade that requires the host to be taken offline or be removed from the cluster 200. The message can be received from any one of the workload schedulers 126 if this functionality is enabled. In some examples, the resource manager 123 can include an API or interface component that enables this functionality when invoked. The resource manager 123 can identify all workload schedulers 126 that have workloads on the host, and provide a command to remove all workloads from the host, remove the host from their records, and reevaluate workload placements.

In step 512, the workload schedulers 126 can evacuate all workloads from the specified host and reevaluate workload placements if appropriate. Reevaluation of workloads can proceed using a process as shown in FIG. 3 or 4, which can apply to initial placements as well as workload migrations.

Stored in the memory device are both data and several components that are executable by the processor. Also stored in the memory can be a datastore 110 and other data. A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. In addition, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

Client devices 108 can be used to access user interfaces generated to configure or otherwise interact with the management service 120. These client devices 108 can include a display upon which a user interface can be rendered. In some examples, the user interface can be generated using user interface data provided by the management system 103. The client device 108 can also include one or more input/output devices that can include, for example, a capacitive touchscreen or other type of touch input device, fingerprint reader, or keyboard.

Although the various programs and applications of the systems described herein can be embodied in software or code executed by general-purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

Sequence diagrams and flowcharts can show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagrams and flowcharts can show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including program code, instructions, and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. While certain aspects can be discussed with respect to a particular figure, the aspects discussed with respect a particular figure can also be performed in the context of other figures as can be understood. All such modifications and variations are intended to be included herein within the scope of this disclosure.

Therefore, the following is claimed:

1. A non-transitory computer-readable medium, comprising executable instructions, wherein the instructions, when executed by at least one processor, cause at least one computing device to at least:
   receive, by a resource manager from a workload scheduler, a candidate host request comprising workload resource requirements for a workload;
   transmit, from the resource manager to the workload scheduler, a set of candidate host snapshots for a plurality of candidate hosts identified based at least in part on the workload resource requirements;
   receive, by the resource manager from the workload scheduler, a workload allocation request that specifies a host selected by the workload scheduler for the workload;
   lock, by the resource manager, the host to prevent allocation of additional workloads to the host by other workload schedulers; and
   transmit, from the resource manager to the workload scheduler, an indication that the hardware resources are successfully reserved for execution of the workload.

2. The non-transitory computer-readable medium of claim 1, wherein the workload scheduler is one of a plurality of workload schedulers that coordinate workload scheduling in a cluster using the resource manager for the cluster.

3. The non-transitory computer-readable medium of claim 2, the instructions, when executed by at least one processor, cause at least one computing device to at least:
   monitor, by the resource manager, at least one host parameter associated with host reliability or host resource usage for a plurality of hosts in a cluster;
   identify, by the resource manager, that the at least one host parameter for a particular host triggers at least one threshold; and
   transmit, by the resource manager to a respective one of a plurality of workload schedulers that are identified to have placed at least one workload scheduled on the particular host, a command to perform a workload action, wherein the workload action comprises a workload evacuation or a workload reevaluation.

4. The non-transitory computer-readable medium of claim 2, wherein the plurality of workload schedulers schedule a plurality of different workload types, and a respective one of the plurality of workload schedulers uses a different workload-type-specific placement algorithm.

5. The non-transitory computer-readable medium of claim 1, wherein the workload scheduler comprises at least one of: a container scheduler, a virtual machine scheduler, a failover capacity scheduler, a cluster-level service scheduler, a host-level service scheduler, and an accelerator scheduler.

6. The non-transitory computer-readable medium of claim 1, wherein the instructions, when executed by at least one processor, cause at least one computing device to at least:
receive, by the resource manager from the workload scheduler, an acquire host request that specifies the host.

7. The non-transitory computer-readable medium of claim 6, wherein the resource manager locks the host based at least in part on the acquire host request.

8. A method performed by instructions executed by at least one processor of at least one computing device, the instructions comprising:
receiving, by a resource manager from a workload scheduler, a candidate host request comprising workload resource requirements for a workload;
transmitting, from the resource manager to the workload scheduler, a set of candidate host snapshots for a plurality of candidate hosts identified based at least in part on the workload resource requirements;
receiving, by the resource manager from the workload scheduler, a workload allocation request that specifies a host selected by the workload scheduler for the workload;
locking, by the resource manager, the host to prevent allocation of additional workloads to the host by other workload schedulers; and
transmitting, from the resource manager to the workload scheduler, an indication that the hardware resources are successfully reserved for execution of the workload.

9. The method of claim 8, wherein the workload scheduler is one of a plurality of workload schedulers that coordinate workload scheduling in a cluster using the resource manager for the cluster.

10. The method of claim 9, further comprising:
monitoring, by the resource manager, at least one host parameter associated with host reliability or host resource usage for a plurality of hosts in a cluster;
identifying, by the resource manager, that the at least one host parameter for a particular host triggers at least one threshold; and
transmitting, by the resource manager to a respective one of a plurality of workload schedulers that are identified to have placed at least one workload scheduled on the particular host, a command to perform a workload action, wherein the workload action comprises a workload evacuation or a workload reevaluation.

11. The method of claim 9, wherein the plurality of workload schedulers schedule a plurality of different workload types, and a respective one of the plurality of workload schedulers uses a different workload-type-specific placement algorithm.

12. The method of claim 8, wherein the workload scheduler comprises at least one of: a container scheduler, a virtual machine scheduler, a failover capacity scheduler, a cluster-level service scheduler, a host-level service scheduler, and an accelerator scheduler.

13. The method of claim 8, further comprising:
receiving, by the resource manager from the workload scheduler, an acquire host request that specifies the host.

14. The method of claim 13, wherein the resource manager locks the host based at least in part on the acquire host request.

15. A system comprising:
at least one computing device comprising at least one processor;
at least one memory comprising executable instructions, wherein the instructions, when executed by the at least one processor, cause the at least one computing device to at least:
receive, by a resource manager from a workload scheduler, a candidate host request comprising workload resource requirements for a workload;
transmit, from the resource manager to the workload scheduler, a set of candidate host snapshots for a plurality of candidate hosts identified based at least in part on the workload resource requirements;
receive, by the resource manager from the workload scheduler, a workload allocation request that specifies a host selected by the workload scheduler for the workload;
lock, by the resource manager, the host to prevent allocation of additional workloads to the host by other workload schedulers; and
transmit, from the resource manager to the workload scheduler, an indication that the hardware resources are successfully reserved for execution of the workload.

16. The system of claim 15, wherein the workload scheduler is one of a plurality of workload schedulers that coordinate workload scheduling in a cluster using the resource manager for the cluster.

17. The system of claim 16, wherein the instructions, when executed by at least one processor, cause at least one computing device to at least:
monitor, by the resource manager, at least one host parameter associated with host reliability or host resource usage for a plurality of hosts in a cluster;
identify, by the resource manager, that the at least one host parameter for a particular host triggers at least one threshold; and
transmit, by the resource manager to a respective one of a plurality of workload schedulers that are identified to have placed at least one workload scheduled on the particular host, a command to perform a workload action, wherein the workload action comprises a workload evacuation or a workload reevaluation.

18. The system of claim 16, wherein the plurality of workload schedulers schedule a plurality of different workload types, and a respective one of the plurality of workload schedulers uses a different workload-type-specific placement algorithm.

19. The system of claim 16, wherein the workload scheduler comprises at least one of: a container scheduler, a virtual machine scheduler, a failover capacity scheduler, a cluster-level service scheduler, a host-level service scheduler, and an accelerator scheduler.

20. The system of claim 15, wherein the instructions, when executed by at least one processor, cause at least one computing device to at least:
receive, by the resource manager from the workload scheduler, an acquire host request that specifies the host, wherein the resource manager locks the host based at least in part on the acquire host request.

* * * * *